(12) United States Patent
Muramatsu et al.

(10) Patent No.: US 12,509,163 B2
(45) Date of Patent: Dec. 30, 2025

(54) SEAT BRACKET STRUCTURE

(71) Applicant: HONDA MOTOR CO., LTD., Tokyo (JP)

(72) Inventors: Yuki Muramatsu, Tokyo (JP); Kota Fujisawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 483 days.

(21) Appl. No.: 18/192,157

(22) Filed: Mar. 29, 2023

(65) Prior Publication Data

US 2023/0311715 A1 Oct. 5, 2023

(30) Foreign Application Priority Data

Mar. 31, 2022 (JP) .................. 2022-058705

(51) Int. Cl.
*B62D 25/20* (2006.01)
*B60N 2/005* (2006.01)

(52) U.S. Cl.
CPC .......... *B62D 25/2036* (2013.01); *B60N 2/005* (2013.01)

(58) Field of Classification Search
CPC ...... B62D 21/157; B62D 21/08; B62D 21/02; B62D 21/03; B62D 25/025; B62D 25/2036; B62D 25/20; B62D 27/023; B62D 27/026; B62D 65/14
USPC .. 296/193.07, 187.08, 193.02, 204, 205, 29, 296/30
See application file for complete search history.

(56) References Cited

U.S. PATENT DOCUMENTS

| | | | |
|---|---|---|---|
| 2013/0214558 A1* | 8/2013 | Lohmann ............... | B62D 21/15 296/187.08 |
| 2016/0068196 A1* | 3/2016 | Saeki .................... | B62D 21/157 296/187.08 |
| 2016/0159402 A1* | 6/2016 | Nakaya .................. | B60N 2/005 296/193.02 |
| 2017/0057549 A1 | 3/2017 | Saeki et al. | |
| 2017/0106906 A1* | 4/2017 | Onishi ............... | B62D 25/2036 |
| 2017/0144711 A1* | 5/2017 | Daigaku ................ | B62D 21/02 |
| 2019/0092396 A1* | 3/2019 | Abe .................... | B62D 25/2018 |
| 2019/0144046 A1* | 5/2019 | Saeki ..................... | B60N 2/015 296/204 |
| 2020/0114978 A1* | 4/2020 | Liu ..................... | B62D 25/2036 |

(Continued)

FOREIGN PATENT DOCUMENTS

| | | | |
|---|---|---|---|
| DE | 102007021223 B4 * | 11/2010 | ......... B62D 25/2036 |
| DE | 102016223316 A1 * | 5/2018 | ............. B62D 25/20 |

(Continued)

*Primary Examiner* — Amy R Weisberg
*Assistant Examiner* — Wenwei Zhuo
(74) *Attorney, Agent, or Firm* — Rankin, Hill & Clark LLP

(57) ABSTRACT

The seat bracket structure has a floor cross member linking a side sill and a floor tunnel of a vehicle to each other and a plurality of seat brackets disposed frontward and rearward of the floor cross member in a vehicle front-rear direction and linked to the side sill or the floor tunnel and to the floor cross member. The seat brackets each include a main body portion that forms a hollow section with a floor panel as a bottom surface and is spaced away from the floor cross member and a linkage portion that extends from the main body portion in the front-rear direction, is joined to the floor panel, and is linked to a flange which is a lower edge portion of the floor cross member.

7 Claims, 7 Drawing Sheets

(56) References Cited

U.S. PATENT DOCUMENTS

| | | | | |
|---|---|---|---|---|
| 2023/0202578 A1* | 6/2023 | Maruyama | ......... | B62D 25/2036 296/193.07 |
| 2023/0202581 A1* | 6/2023 | Maruyama | ............ | B62D 21/03 296/193.07 |
| 2023/0202582 A1* | 6/2023 | Inagaki | ................. | B62D 25/04 296/193.07 |
| 2023/0312017 A1* | 10/2023 | Muramatsu | ......... | B62D 25/025 296/193.07 |

FOREIGN PATENT DOCUMENTS

| | | | | |
|---|---|---|---|---|
| DE | 102019207486 B4 * | 3/2021 | ............ | B60N 2/015 |
| JP | 2017-043155 A | 3/2017 | | |

\* cited by examiner

SEAT BRACKET STRUCTURE

CROSS-REFERENCE TO RELATED APPLICATION

This application is based upon and claims priority from the Japanese Patent Application No. 2022-058705, filed on Mar. 31, 2022, the entire contents of which are incorporated herein by reference.

BACKGROUND OF THE INVENTION

1. Field of the Invention

The present invention relates to a seat bracket structure joined to a floor panel in a vehicle to place a seat.

2. Description of the Related Art

Conventionally, as a seat bracket structure, there is a structure for connecting seat brackets for mounting and supporting a seat for an occupant to sit in to a floor cross member (also referred to as a cross member). The cross member extends in the vehicle width direction, intersecting with and joined to a floor tunnel extending in the vehicle front-rear direction. In JP2017-43155A, a seat bracket with a predetermined length is joined to a side sill extending in the vehicle front-rear direction and extends along the side sill, and also, another seat bracket with a predetermined length is joined to a side surface of a floor tunnel. Closed-section end portions of a cross member are joined to a side surface of the seat bracket joined to the side sill and to a side surface of the seat bracket jointed to the floor tunnel.

However, in the structure described in JP2017-43155A in which the seat brackets are joined to the closed-section end portions of the cross member, the seat brackets receive a load from various directions, causing a three-dimensional twist at the portion where each seat bracket and the cross member join. In other words, because the upper, lower, left, and right portions of the closed section end portions of the cross member with high rigidity are joined to the seat brackets, the following situation may occur when a load is variously inputted in up-down directions and the left-right directions. Specifically, in a case of input of a load that moves the cross member upward and a load that moves the seat bracket downward, the upper and lower horizontal joint portions are susceptible to separation. In a case of input of a load that moves the cross member and the seat brackets in different left-right directions, the left and right vertical joint portions are susceptible to separation.

SUMMARY OF THE INVENTION

The present invention has been made in view of such problems and circumstances, and has an object to provide a seat bracket structure in which joint portions between a floor cross member and a seat bracket for supporting a seat are less susceptible to separation.

A seat bracket structure of the present invention for achieving the above object is a seat bracket structure including: a floor cross member linking a side sill and a floor tunnel of a vehicle to each other; and a plurality of seat brackets disposed frontward and rearward of the floor cross member in a vehicle front-rear direction and linked to the side sill or the floor tunnel and to the floor cross member, in which the seat brackets each include a main body portion that forms a hollow section with a floor panel as a bottom surface and is spaced away from the floor cross member and a linkage portion that extends from the main body portion in the front-rear direction along an upper surface of the floor panel and linked to a lower edge portion of the floor cross member.

The present invention can obtain a seat bracket structure in which joint portions between a floor cross member and a seat bracket for supporting a seat are less susceptible to separation.

DETAILED DESCRIPTION OF THE EMBODIMENTS

Configuration of the Embodiment

Figure 1:
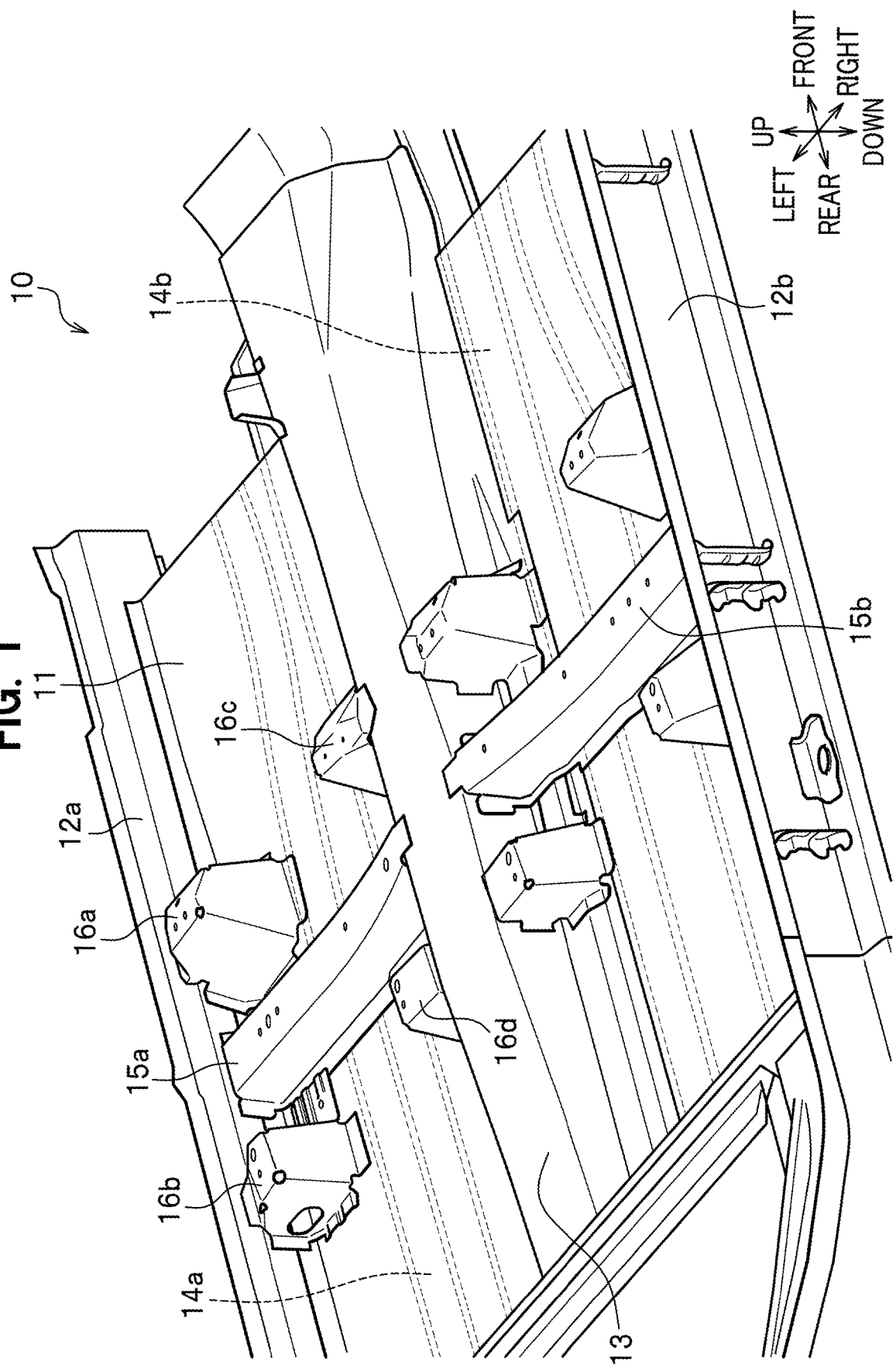
FIG. 1 is a perspective view showing a seat bracket structure on a floor panel in a vehicle of the present embodiment.

An embodiment of the present invention is described in detail with reference to FIGS. 1 to 7. In the description, the same reference numerals are used to denote the same elements to avoid repetitive descriptions. Also, "front" and "rear," "left" and "right," and "up" and "down" indicated by the arrows in the drawings respectively indicate the front-rear direction of an automobile (not shown), the width direction of the automobile, and the vertical up-down direction.

FIG. 1 is a perspective view showing a seat bracket structure on a floor panel in a vehicle.

A seat bracket structure 10 shown in FIG. 1 is configured including a floor panel 11 provided in a vehicle, side sills 12a, 12b, a floor tunnel 13, floor frames 14a, 14b (see FIG. 4), floor cross members 15a, 15b, and a plurality of seat brackets 16a, 16b, 16c, 16d. Note that the seat brackets 16a to 16d are disposed on the left side and the right side of the floor tunnel 13 at symmetric locations, and only the ones on the left side in the vehicle width direction are denoted by reference numerals and described as representatives.

The side sills 12a, 12b extend in the vehicle front-rear direction (also referred to as the front-rear direction), and are joined to the vehicle-width-direction outer marginal portions of the floor panel 11. The floor tunnel 13 extend in the front-rear direction in the middle between the side sills 12a, 12b that are at both sides of the vehicle. Further, the floor tunnel 13 is joined to the vehicle-width-direction inner marginal portions of the floor panel 11 in such a manner that the opening of the tunnel faces downward to the vehicle exterior side (the exterior side).

Figure 2:
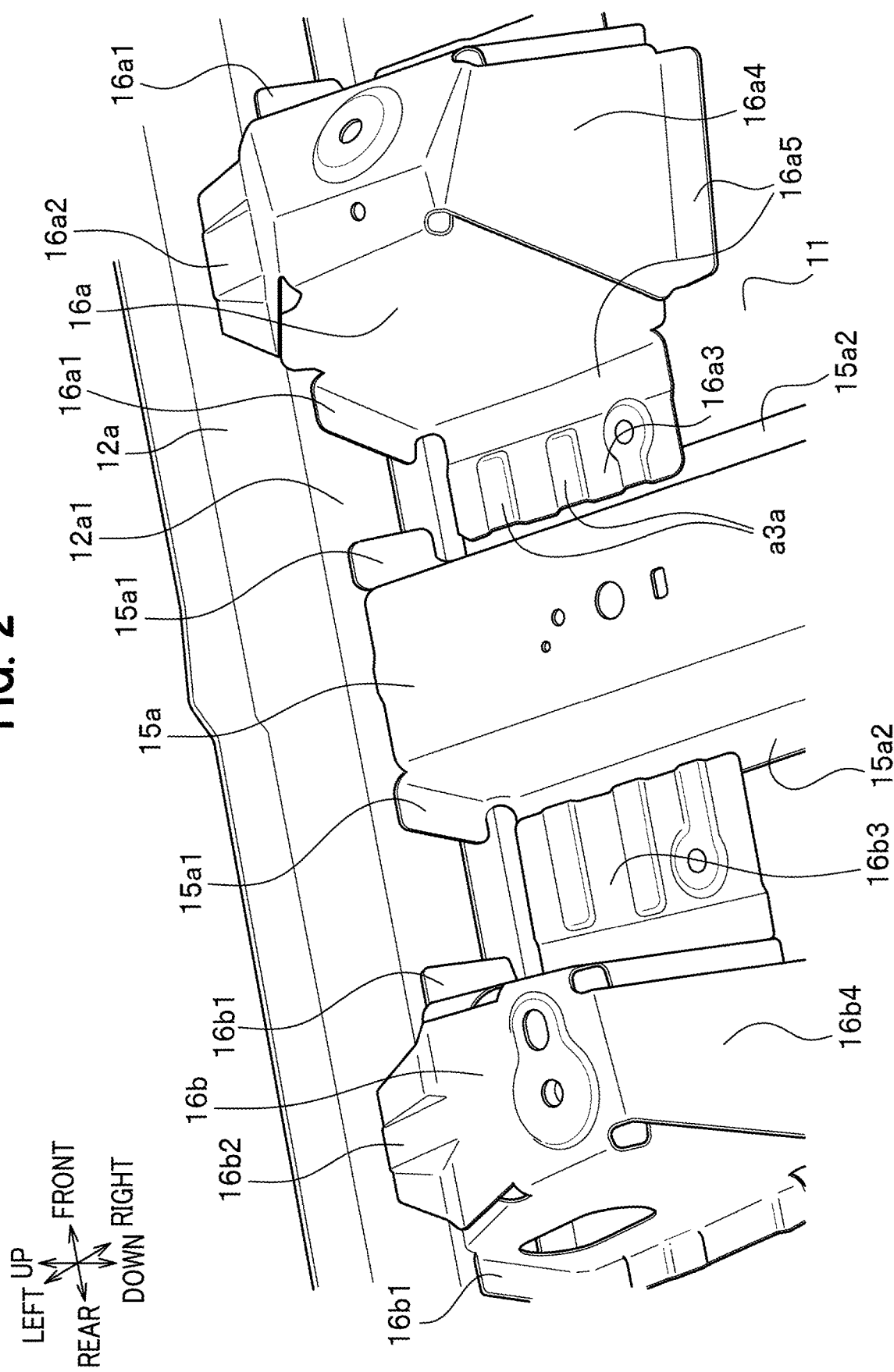
FIG. 2 is a perspective view showing the seat bracket structure frontward and rearward of a cross member on the side sill side.

The floor cross members (also referred to as cross members) 15a, 15b extend in the vehicle width direction and link the side sills 12a, 12b to the floor tunnel 13, respectively. As shown in FIG. 2, the left cross member 15a forms a hollow section (closed section) with the floor panel 11 as the bottom surface. Vertical flanges 15a1, 15a1 provided by bending the left and right portions (corresponding to vehicle front and rear portions) of a closed-section end portion of the cross member 15a are joined to a side surface of the side sill 12a on the vehicle inner side by welding or the like. Also, the other closed-section end portion of the cross member 15a shown in FIG. 4 has vertical flanges joined to a side surface of the floor tunnel 13 that faces outward in the vehicle width direction. Having the same structure as the left cross member 15a, the right cross member 15b is not described here.

As shown in FIG. 1, the seat brackets 16a to 16d are for mounting and supporting a seat (not shown) for an occupant to sit in, and are disposed frontward and rearward of the cross member 15a in the vehicle front-rear direction. Each of the seat brackets 16a to 16d is linked to the side sill 12a or the floor tunnel 13 and to the cross member 15a.

The seat brackets 16a, 16b on the side sill 12a side shown in FIG. 2 each form a hollow section with the floor panel 11 as the bottom surface, and include a main body portion 16a4, 16b4 away from the cross member 15a in the front-rear direction. The seat brackets 16a, 16b further include linkage portions 16a3, 16b3 extending from the lower edges of the main body portions 16a4, 16b4 in the front-rear direction along the upper surface of the floor panel 11. The linkage portions 16a3, 16b3 are lower in height than the main body portions 16a4, 16b4 and are flat in shape. The linkage portions 16a3, 16b3 are linked to flanges 15a2, 15a2 extending from the lower edges of the cross member 15a in the front-rear direction along the upper surface of the floor panel 11. Each of the seat brackets 16a, 16b further includes vertical flanges 16a1, 16b1 that are bent to the left and right (the front and rear of the vehicle) from a close-section end portion of the main body portion 16a4, 16b4. The vertical flanges 16a1, 16b1 are joined to a vehicle-width-direction side surface of the side sill 12a. Further, flanges 16a2, 16b2 extend in the vehicle width direction from the upper portions of the closed-section end portions of the main body portions 16a4, 16b4 and are joined to the upper surface of the side sill 12a. Similarly, the seat brackets 16c, 16d on the floor tunnel 13 side too include a main body portion and a linkage portion.

A description is given using the front seat bracket 16a shown in FIG. 2 as a representative. The linkage portion 16a3 of the seat bracket 16a is formed such that a first flange 16a5 extending from the lower edge of the main body portion 16a4 rearward along the upper surface of the floor panel 11 extends until it overlaps with the second flange 15a2 of the cross member 15a. Thus, the following three points are welded: the floor panel 11, the first flange 16a5 of the seat bracket 16a as the linkage portion 16a3, and the second flange 15a2 of the cross member 15a.

Note that in addition to the first flange 16a5 extending rearward (a direction toward the cross member 15a) from the main body portion 16a4 described above, there are a first flange extending frontward and a first flange 16a5 extending from the main body portion 16a4 to a vehicle inner side in the vehicle width direction.

The first flange 16a5 (or the linkage portion 16a3) of the seat bracket 16a includes a plurality of beads a3a extending in the vehicle front-rear direction and provided at predetermined intervals in the vehicle width direction. The beads a3a form the reinforcement portions described in the claims. To provide the plurality of beads a3a to the first flange 16a5 in this way is, in other words, to provide the plurality of beads a3a to the linkage portion 16a3.

Under the assumption that, for example, an excessive load is inputted to the linkage portion 16a3 without the beads a3a, if an edge of a weld between the linkage portion 16a3 and the floor panel 11 starts to separate, this separation triggers separation at other portions of the weld like a chain reaction, which possibly causes separation of the entire linkage portion 16a3.

However, if the plurality of beads a3a are formed at the linkage portion 16a3 with spaces from each other like in the present embodiment, the beads a3a exist between a plurality of welds. Thus, even if one of the welds of the linkage portion 16a3 is separated, there is a bead a3a existing in the direction of the separation of the weld. Thus, energy is absorbed by the bead a3a by, e.g., stretching. This absorption inhibits the linkage portion 16a3 from becoming separated by a chain reaction and stops the separation midway, thus making it possible to prevent a chain-reaction separation of the weld.

All of the first flanges 16a5 of the seat bracket 16a are welded to the floor panel 11 by weld bonding. The linkage portion 16a3 and the second flange 15a2 of the cross member 15a are joined by spot welding at portions other than the beads a3a. In weld bonding, an adhesive is applied at predetermined intervals in the long-side direction of the first flange 16a5, and spot welding is performed at portions without the adhesive. Joining the first flange 16a5 of the seat bracket 16a to the floor panel 11 by such weld bolding can enhance the joint strength.

Figure 4:
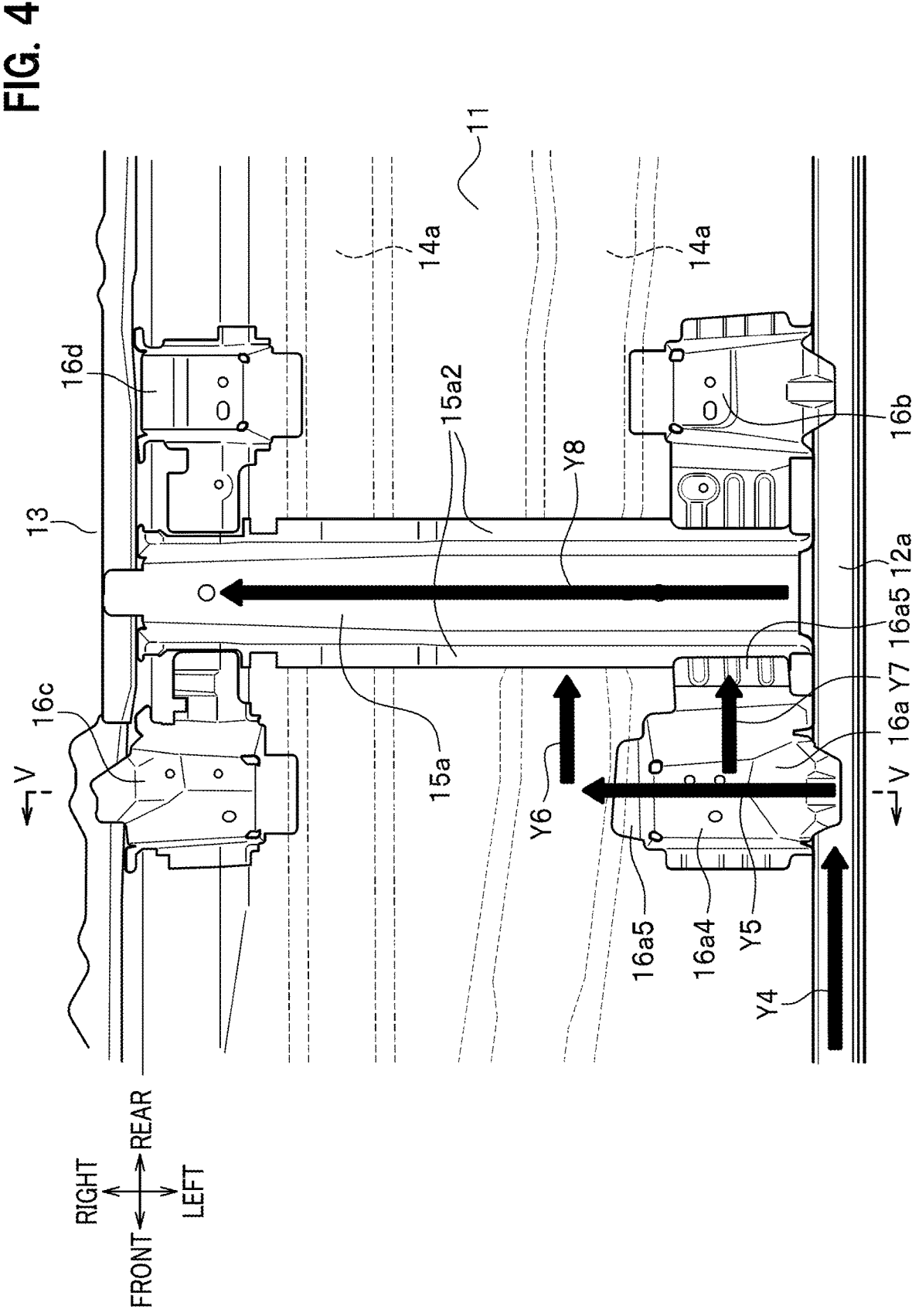
FIG. 4 is a perspective view showing how the seat brackets on the side sill side are joined to a floor frame and the cross member.

As shown in FIG. 4, below the floor panel 11 on the exterior side, there are two floor frames 14a extending in the vehicle front-rear direction in parallel between the seat brackets 16a, 16b on the side sill 12a and the seat brackets 16c, 16d on the floor tunnel 13 side. In other words, the floor frames 14a are provided below the floor panel 11 between the seat brackets 16a, 16b and the seat brackets 16c, 16d that are disposed away from each other in the vehicle width direction. Also, the floor frames 14a each include third flanges 14a1 (see FIG. 5) at both sides (the left and right sides) in the vehicle width direction.

Figure 5:
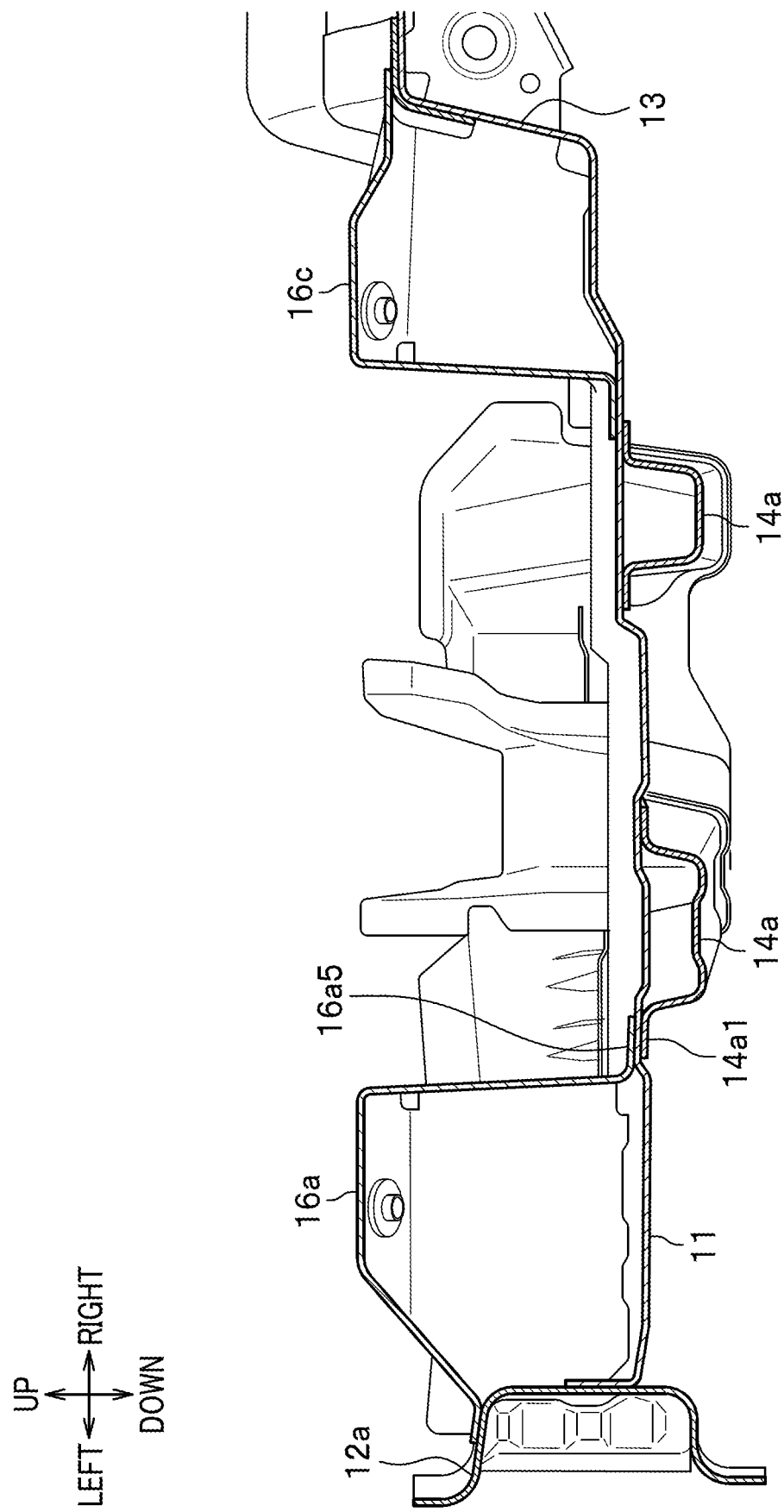
FIG. 5 is a sectional view taken along line V-V in FIG. 4.

The seat bracket 16a in FIG. 5 is described as a representative, FIG. 5 being a sectional view taken along the line V-V in FIG. 4. The first flange 16a5 of the seat bracket 16a shown in FIG. 5 extends to the vehicle inner side in the vehicle width direction and is welded to the third flange 14a1 of the floor frames 14a with the floor panel 11 in between. Also, the first flange 16a5 of the seat bracket 16a shown in FIG. 4 that extends rearward is welded to the second flange 15a2 of the cross member 15a.

Because the two first flanges 16a5 of the seat bracket 16a are thus welded to the third flange 14a1 (FIG. 5) of the floor frame 14a with the floor panel 11 in between and to the second flange 15a2 of the cross member 15a, the following effects are provided.

A load transmitted through the side sill 12a to the vehicle rear side as indicated by arrow Y4 in FIG. 4 is transferred to the first flange 16a5 in the vehicle width direction and the first flange 16a5 (the linkage portion 16a3) at the rear side indicated by arrow Y7 via the main body portion 16a4 of the seat bracket 16a as indicated by arrow Y5. As indicated by arrow Y6, the load transferred to the first flange 16a5 in the vehicle width direction is transferred to the cross member 15a via the floor frames 14a. The load transferred to the first flange 16a5 at the rear side is, as indicated by arrow Y7, transferred to the cross member 15a via the floor frames 14a. Thus, the load inputted to the seat bracket 16a can be distributed to the floor frame 14a indicated by arrow Y6 and the cross member 15a indicated by arrow Y7.

The load transferred to the cross member 15a are, as indicated by arrow Y8, transferred to the vehicle inner side in the vehicle width direction (the long-side direction) of the cross member 15a.

Figure 6:
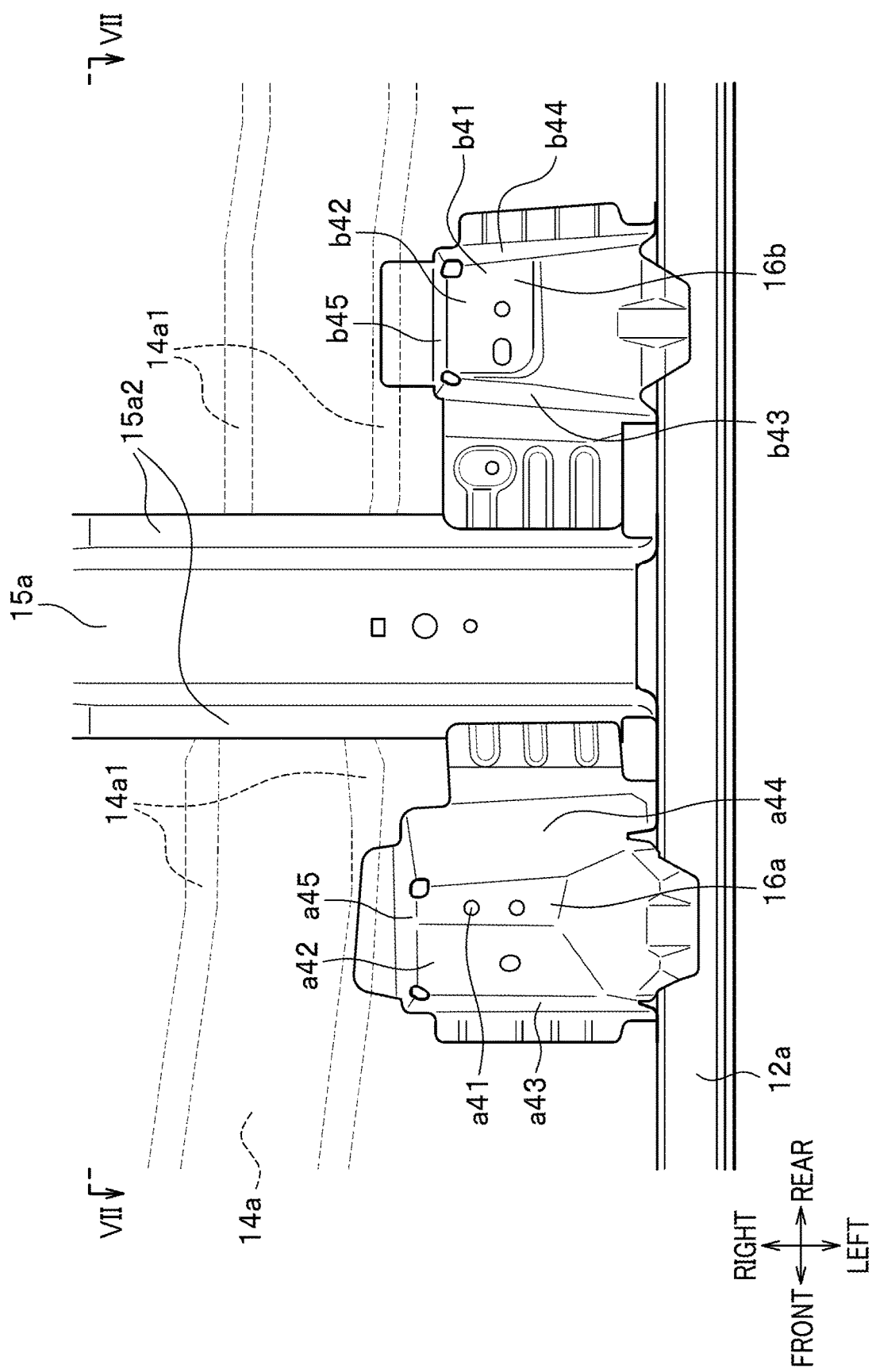
FIG. 6 is a perspective view showing the walls of main body portions of the seat brackets.

As shown in FIG. 6, the third flanges 14a1 at both sides of the floor frame 14a in the vehicle width direction are joined (welded) to the front and rear second flanges 15a2 of the cross member 15a with the floor panel 11 in between. When the floor frames 14a and the cross member 15a are thus welded together, a load inputted to the floor frames 14a can be transferred to the cross member 15a.

As shown in FIG. 6, the main body portion 16a4 of the front seat bracket 16a includes a top portion a42 having fastening portions a41 for a seat (not shown), a front wall a43 extending downward from the top portion a42 and facing to the vehicle front side, a rear wall a44 facing to the rear side, and a side wall a45 facing to a vehicle inner side in the vehicle width direction. Also, the rear seat bracket 16b likewise includes a top portion b42 having fastening portions b41, a front wall b43, a rear wall b44, and a side wall b45.

Figure 7:
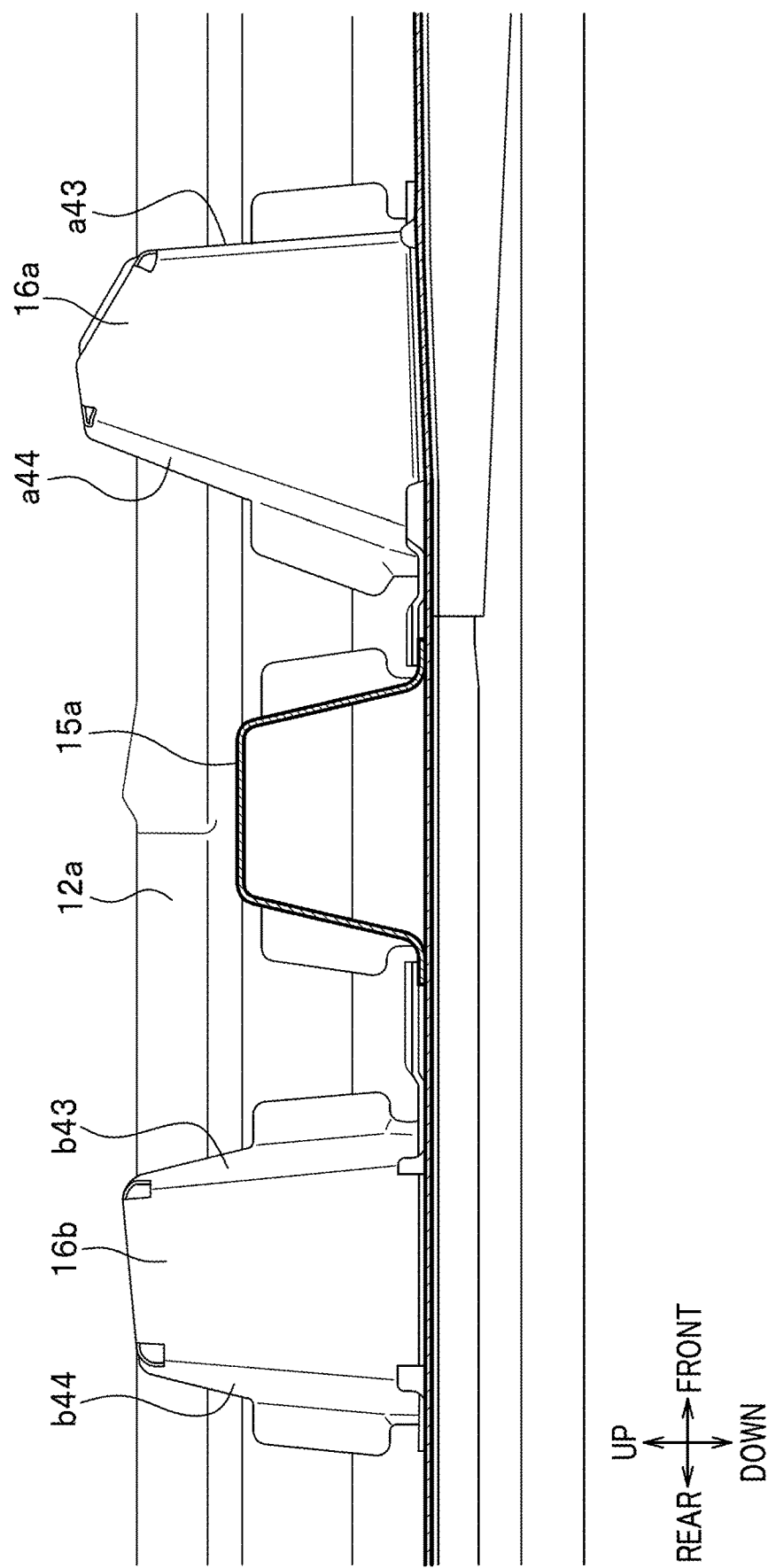
FIG. 7 is a side view of the seat brackets seen from a section VII-VII in FIG. 6.

FIG. 7 shows a side view of the seat brackets 16a, 16b shown in a side view looking toward the side sill 12a. The front wall a43 and the rear wall a44 of the front seat bracket 16a are slanted, extending away from each other toward the bottom in such a way that they are farthest at the bottom (slanted like the legs of a trapezoid). This is true to the front wall b43 and the rear wall b44 of the rear seat bracket 16b.

If the front wall a43 and the rear wall a44 of the seat bracket 16a were upright perpendicularly to the floor panel 11, the seat is susceptible to falling over upon application of a load in the vehicle front-rear direction. When the front wall a43 and the rear wall a44 of the seat bracket 16a are slanted like the legs of a trapezoid as in the present embodiment, the seat is less susceptible to falling over because the load in the front-rear direction can be resisted and absorbed.

Advantageous Effects of the Embodiment

Next, the characteristic configuration and the advantageous effects of the seat bracket structure of the present embodiment described above are described. The seat bracket structure 10 has the floor cross member 15a, 15b linking the side sill 12a, 12b and the floor tunnel 13 of the vehicle to each other and the plurality of seat brackets 16a to 16d disposed frontward and rearward of the floor cross member 15a, 15b in the vehicle front-rear direction and linked to the side sill 12a, 12b or the floor tunnel 13 and to the floor cross member 15a, 15b.

(1) The seat brackets 16a to 16d are each configured including the main body portion 16a4, 16b4 that forms a hollow section with the floor panel 11 as a bottom surface and is spaced away from the floor cross member 15a, 15b and the linkage portion 16a3, 16b3 extending from the main body portion 16a4, 16b4 in the front-rear direction along the upper surface of the floor panel 11 and linked to the flange 15a2 which is a lower edge portion of the floor cross member 15a, 15b.

According to this configuration in which the seat brackets 16a to 16d are each linked to the lower edge portion of the cross member 15a at the linkage portion 16a3, 16b3, the linkage portion 16a3, 16b3 can be set to be low in height with a substantially flat shape. When the linkage portion 16a3, 16b3 is thus set to be low, upon input of a three-dimensional load from various directions such as a collision of the vehicle and a twist of the vehicle body, the twist is negated and reduced at the linkage portion 16a3, 16b3. This reduction helps prevent the linkage between the cross member 15a and the seat brackets 16a to 16d from being disconnected or separated. Thus, a transfer route for an input load to the cross member 15a can be maintained.

Figure 3:
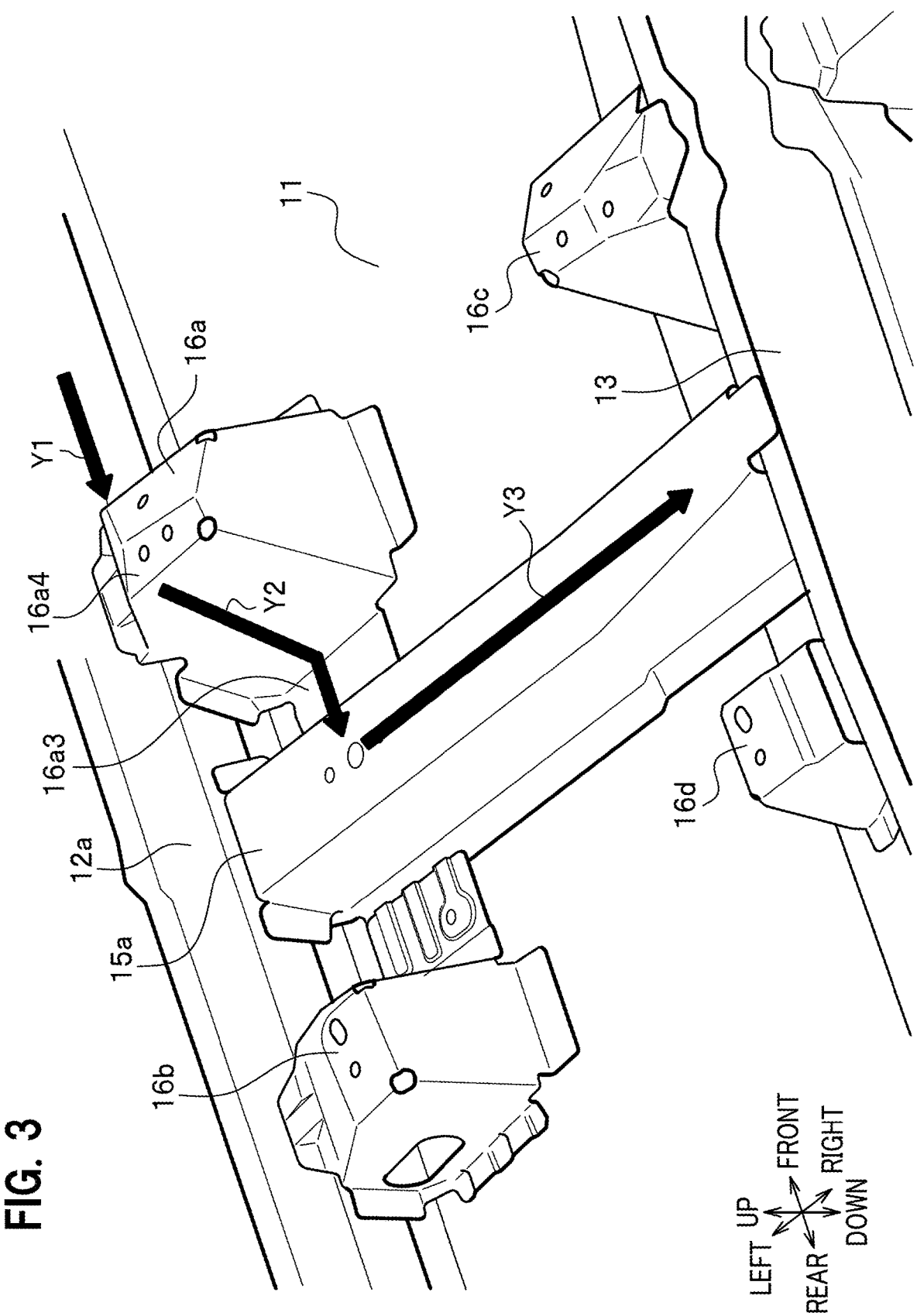
FIG. 3 is a perspective view showing the seat bracket structure frontward and rearward of the cross member between the side sill and a floor tunnel.

For example, a load transmitted through the side sill 12a toward the vehicle rear side as indicated by arrow Y1 in FIG. 3 is, as indicated by arrow Y2, transferred from the main body portion 16a4 of the seat bracket 16a to the cross member 15a via the linkage portion 16a3, and as indicated by arrow Y3, transmitted in the long-side direction of the cross member 15a. The above-described input load indicated by arrow Y2 is absorbed and reduced because the substantially flat linkage portion 16a3 welded to the floor panel 11 negates twisting. Thus, the linkage portion 16a3 permits and absorbs deformation due to twisting and helps prevent separation at a weld between the seat bracket 16a and the cross member 15a. In other words, welds between the cross member 15a and the seat brackets 16a to 16d supporting the seat can be less susceptible to separation.

(2) The seat bracket (e.g., the seat bracket 16a) includes the first flange 16a5 extending from the lower edge of the main body portion 16a4 toward the cross member 15a along the upper surface of the floor panel 11. The linkage portion 16a3 is formed such that the first flange 16a5 extends to the second flange 15a2, which is the lower edge portion of the cross member 15a.

According to this configuration, the linkage portion 16a3 is formed by the extension of the first flange 16a5 of the seat bracket 16a, which is joined to the floor panel 11, to the second flange 15a2 of the cross member 15a. By being thus formed, the linkage portion 16a3 can have a low height with a substantially flat shape. Upon input of a three-dimensional load to the vehicle body, the substantially flat linkage portion 16a3 can negate and reduce twisting, which consequently helps prevent breakage or separation from occurring at the linkage between the seat bracket 16a and the cross member 15a.

(3) The first flange 16a5 includes beads a3a as a plurality of reinforcement portions extending in the front-rear direction and provided at predetermined intervals in the vehicle width direction.

According to this configuration in which the first flange 16a5 includes a plurality of beads a3a, even if one of welds of the linkage portion 16a3 becomes separated, due to the presence of the beads a3a, the beads a3a absorb the energy by, e.g., stretching. This inhibits the first flange 16a5 from separating like a chain reaction and stops the separation midway, which helps prevent welds from being separated like a chain reaction. Thus, the rigidity of the linkage portion 16a3 can be ensured even with a structure such that the linkage portion 16a3 formed by the first flange 16a5 is substantially flat and low in height, and thus, a load inputted to the seat bracket 16a can be transferred to the cross member 15a.

(4) The first flange 16a5 of the seat bracket 16a is welded to the floor panel 11 with an adhesive interposed in between, and the linkage portion 16a3 and the second flange 15a2 of the cross member 15a are joined to each other by spot welding.

According to this configuration, the first flange 16a5 of the seat bracket 16a and the floor panel 11 are joined by weld bonding in which they are welded with an adhesive interposed in between, and the linkage portion 16a3 is joined to the cross member 15a by spot welding. Thus, the rigidity of the seat bracket's main body portion 16a4 can be improved, and a load inputted to the seat bracket 16*a* can be efficiently transferred from the linkage portion 16*a*3 to the cross member 15*a*.

(5) The seat bracket structure includes the floor frames 14*a* extending in the front-rear direction below the floor panel 11 at the exterior side and having the third flanges 14*a*1 in the vehicle width direction. The floor frames 14*a* are provided between the seat brackets 16*a*, 16*c* disposed away from each other in the vehicle width direction. The first flanges 16*a*5 of the seat brackets 16*a*, 16*c* are welded to the third flanges 14*a*1 of the floor frames 14*a*, 14*b* with the floor panel 11 in between.

According to this configuration, a load inputted to the seat bracket 16*a* as indicated by arrows Y4, Y5 in FIG. 4 can be distributed to the floor frame 14*a* and the cross member 15*a* via the floor panel 11 as indicated by arrows Y6, Y7 in FIG. 4. This helps prevent separation of the seat bracket 16*a* from the floor panel 11.

(6) The third flanges 14*a*1 of the floor frames 14*a* and the second flanges 15*a*2 of the cross member 15*a* are joined to each other with the floor panel 11 interposed in between.

According to this configuration in which the floor frames 14*a* and the cross member 15*a* are welded together, a load inputted to the floor frames 14*a* can be transferred to the cross member 15*a*. Thus, a load can be transferred from the seat bracket 16*a* to the cross member 15*a* via the floor frame 14*a*, which helps prevent separation of the seat bracket 16*a*.

(7) The main body portion 16*a*4 of the seat bracket 16*a* includes the top portion a42 having the set fastening portions a41, the front wall a43 extending downward from the top portion a42 and facing to the vehicle front side, the rear wall a44 facing to the rear side, and the side wall a45 facing in the vehicle width direction. The front wall a43 and the rear wall a44 of the seat bracket 16*a* are slanted, extending farther away from each other toward the bottom (slanted like the legs of a trapezoid).

According to this configuration in which the front wall a43 and the rear wall a44 of the seat bracket 16*a* are slanted like the legs of a trapezoid, a load in the front-rear direction can be resisted and absorbed, which can make the seat less susceptible to falling over. In other words, because the front wall a43 and the rear wall a44 are slanted, rigidity against falling over of the seat bracket 16*a* and against a load inputted from the seat can be ensured. Also, because of the slant like the legs of a trapezoid, the distance from the main body portion 16*a*4 of the seat bracket 16*a* to the cross member 15*a* can be set to be short, which makes it possible to shorten the linkage portion 16*a*3 and therefore to efficiently transfer a load from the seat bracket 16*a* to the cross member 15*a*.

Although the vehicle body structure according to the present embodiment has thus been described, the present invention is not limited to this and can be modified appropriately without departing from the gist of the present invention.

What is claimed is:

1. A seat bracket structure comprising:
a floor cross member linking a side sill and a floor tunnel of a vehicle to each other; and
a plurality of seat brackets disposed frontward and rearward of the floor cross member in a vehicle front-rear direction and linked to the side sill or the floor tunnel and to the floor cross member, wherein
the seat brackets each include
a main body portion that forms a hollow section with a floor panel as a bottom surface and is spaced away from the floor cross member and
a linkage portion that extends from the main body portion in the front-rear direction along an upper surface of the floor panel and linked to a lower edge portion of the floor cross member.

2. The seat bracket structure according to claim 1, wherein
the seat bracket includes a first flange extending from a lower edge of the main body portion toward the floor cross member along the upper surface of the floor panel, and
the linkage portion is formed such that the first flange extends to a second flange which is the lower edge portion of the floor cross member.

3. The seat bracket structure according to claim 2, wherein
the first flange includes a plurality of reinforcement portions extending in the vehicle front-rear direction and provided at predetermined intervals in a vehicle width direction.

4. The seat bracket structure according to claim 3, wherein
the first flange of the seat bracket is welded to the floor panel with an adhesive interposed in between, and
the linkage portion and the second flange of the floor cross member are joined to each other by spot welding.

5. The seat bracket structure according to claim 4, comprising a floor frame extending in the vehicle front-rear direction below the floor panel at an exterior side and having third flanges in the vehicle width direction,
the floor frame is provided between the seat brackets disposed away from each other in the vehicle width direction, and
the first flanges of the seat brackets are welded to the third flanges of the floor frame with the floor panel interposed in between.

6. The seat bracket structure according to claim 5, wherein
the third flanges of the floor frame and the second flange of the floor cross member are joined to each other with the floor panel interposed in between.

7. The seat bracket structure according to claim 1, wherein
the main body portion of the seat bracket includes a top portion having a seat fastening portion, a front wall extending downward from the top portion and facing to a vehicle front side, a rear wall facing to a rear side, and a side wall facing in a vehicle width direction, and
the front wall and the rear wall are slanted, extending farther away from each other toward a bottom.

* * * * *